US007594574B2

(12) United States Patent
Mol et al.

(10) Patent No.: US 7,594,574 B2

(45) Date of Patent: Sep. 29, 2009

(54) THERMOPLASTIC BELT CONNECTOR

(75) Inventors: Edward T. Mol, Marne, MI (US); James Honeycutt, Grandville, MI (US)

(73) Assignee: Thermodrive LLC, Grand Rapids, MI (US)

( * ) Notice: Subject to any disclaimer, the term of this patent is extended or adjusted under 35 U.S.C. 154(b) by 0 days.

(21) Appl. No.: 11/718,274

(22) PCT Filed: Nov. 2, 2005

(86) PCT No.: PCT/US2005/039744

§ 371 (c)(1), (2), (4) Date: Apr. 30, 2007

(87) PCT Pub. No.: WO2006/052629

PCT Pub. Date: May 18, 2006

(65) Prior Publication Data

US 2007/0267277 A1 Nov. 22, 2007

Related U.S. Application Data

(60) Provisional application No. 60/522,756, filed on Nov. 3, 2004.

(51) Int. Cl.
*B65G 15/32* (2006.01)

(52) U.S. Cl. .................................................. 198/844.2

(58) Field of Classification Search .............. 198/844.2
See application file for complete search history.

(56) References Cited

U.S. PATENT DOCUMENTS

| | | | | |
|---|---|---|---|---|
| 4,138,011 | A * | 2/1979 | Lapeyre | 198/844.2 |
| 4,170,281 | A * | 10/1979 | Lapeyre | 198/844.2 |
| 5,467,867 | A | 11/1995 | Musil et al. | |
| 6,695,134 | B2 * | 2/2004 | Rubino et al. | 198/851 |
| 6,843,744 | B2 | 1/2005 | Gregg et al. | |
| 2002/0148707 | A1 * | 10/2002 | Tarnawskyj et al. | 198/844.2 |
| 2004/0089519 | A1 | 5/2004 | Pollak et al. | |
| 2004/0195079 | A1 | 10/2004 | Webster et al. | |

* cited by examiner

*Primary Examiner*—Mark A Deuble
(74) *Attorney, Agent, or Firm*—McGarry Bair PC

(57) ABSTRACT

A thermoplastic toothed belt connector (10, 50) for making an endless belt (12) has two leaves (20, 22, 58, 60), adapted to be hingedly connected to each other by knuckles (28, 30, 60, 62) along one or more teeth (38, 52, 54). Each knuckle (28, 30, 60, 62) has a hole (42, 72) extending through tooth portions (39) so that when the holes (42, 72) are in the registry, a pin (32, 74) can be extended through the holes (42, 72) to form the hinge at the teeth (38, 52, 54). The leaves (20, 22, 58, 60) can be adjoined to the ends of a thermoplastic belt (12) to make the belt endless.

23 Claims, 5 Drawing Sheets

THERMOPLASTIC BELT CONNECTOR

CROSS-REFERENCE TO RELATED APPLICATIONS

This application claims priority on International Application No. PCT/US2005/039744, filed Nov. 2, 2005, which claims the benefit of U.S. Provisional Patent Application No. 60/522,756, filed Nov. 3, 2004, both of which are incorporated herein in their entirety.

BACKGROUND OF THE INVENTION

1. Field of the Invention

This invention relates to endless belts for conveyors and, more particularly, to connectors for making thermoplastic endless belts to be driven by sprockets.

2. Description of the Related Art

Low tension, direct drive conveyor belts are typically used in situations where hygiene and cleanliness are critically important. For example, in food processing plants such as those that process meat products for human consumption, low tension, direct drive belt conveyors are used to transport items. Sanitation is critically important and, therefore, the endless belts used in such conveyors are conventionally made of materials that can be hygienically cleaned, such as thermoplastics or stainless steel.

Known belts include those formed of interlocking links having teeth that are adapted to engage drive sprockets. One of the problems with such belts is that food particles can become lodged in the joints of the interconnecting links. Consequently, cleaning the belts can be difficult and may require removing the belt from the conveyor system for special cleaning operations.

It is also known to use flexible toothed thermoplastic belts without interlocking links where the teeth engage drive sprockets as shown in FIG. 1. An endless belt 100 in a typical installation moves around two sprockets 102 and 103. One sprocket 102 is a drive sprocket and the other 103 is typically an idler or slave sprocket. The upper span 105 of the belt will travel in the direction of arrow 107. Each sprocket 102 or 103 has a number of transverse grooves or sheaves 104 spaced around its circumference. The belt 100 has a plurality of teeth 106 equidistantly spaced from each other on the inside surface 108 of the belt. The teeth 106 engage the sheaves 104 of each sprocket.

The belt 100 has an outside surface 110 that is fairly smooth and free of discontinuities. The belt is normally formed by butt welding two ends of the belts together at a seam 112. The outside surface 110 on the upper span 105 is normally the carrying surface for transport of items. A thermoplastic belt is usually under some tension when loaded. A thermoplastic belt under tension will stretch, which may require adjustment of the tension from time to time. Also, the belt may have to be removed from the sprockets for maintenance of the system, for cleaning, or for repair. Removing the endless belt 100 of FIG. 1 is an inconvenience, normally requiring disassembly of the conveyor frame, movement of the sprockets, and possibly destruction of the belt (or at least cutting the belt to be re-seamed later).

SUMMARY OF THE INVENTION

According to the invention, a thermoplastic belt has a belt connector to make the belt endless. The belt connector comprises two leaves, one of them having at least two knuckles and the other leaf having at least one knuckle. All knuckles have a hole therethrough, and each leaf has an opposed butt end to be secured to the belt. A pin is adapted to extend through the holes of the knuckles when the holes are in registry to hingedly secure the leaves to each other.

In another aspect of the invention, a method of making a belt connector includes the steps of molding a piece of thermoplastic material with a flat on one side and three teeth on the other side, a center tooth having a hole extending therethrough; and cutting the piece into two leaves along the center tooth wherein at least two knuckles are formed in one leaf and one knuckle is formed in the other leaf, each knuckle having a tooth with a hole through it.

DESCRIPTION OF THE PREFERRED EMBODIMENT

Figure 2:
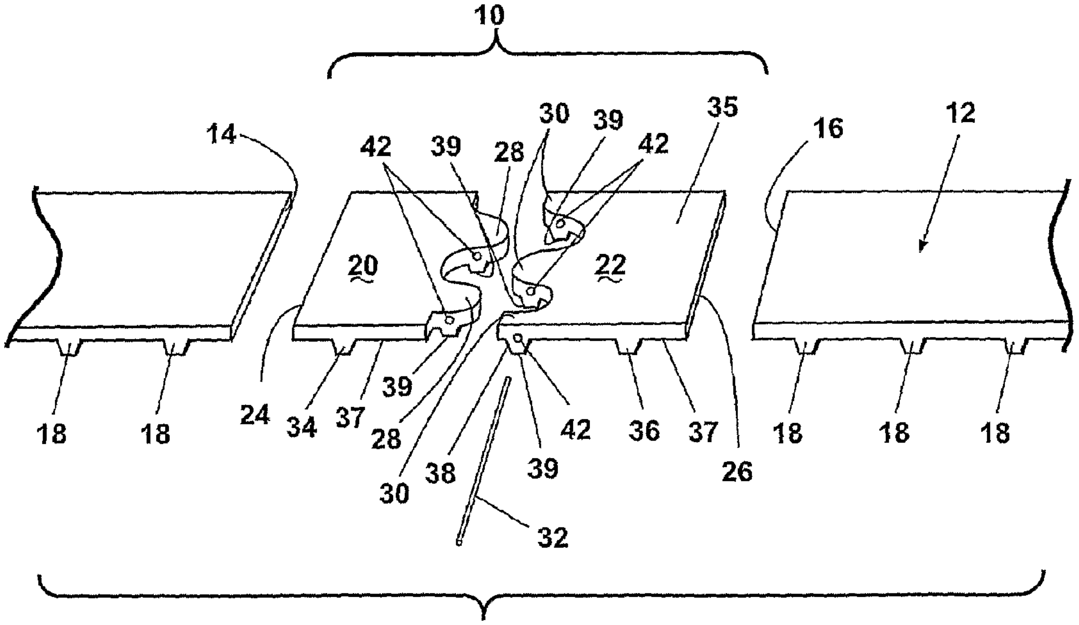
FIG. 2 is an exploded perspective view of a belt connector and belt according to the invention.

Looking now at FIG. 2, a belt connector 10 according to the invention is shown in conjunction with a belt 12 with which it is to be used. The belt 12 is identical to that described above with respect to the prior art, except that it is not endless; the belt 12 has a first end 14 and a second end 16. Each end is preferably established intermediate two teeth 18. The belt 12 can be made from any of a number of methods, e.g., milling, extrusion, and/or injection molding.

The belt connector 10 comprises two leaves 20, 22. Each leaf has a butt end 24, 26, sized to be butt welded to the respective first and second ends 14, 16 in conventional manner. Each leaf also has a plurality of knuckles 28, 30 opposite the butt ends 24, 26 that when joined by a pin 32, will form a hinge. Preferably, each leaf has a tooth 34, 36, so located that when the butt ends 24, 26 are welded to the first and second ends 14, 16 on the belt, the pitch of the teeth will remain unchanged.

The knuckles 28, 30 each have tooth portions 39 that are preferably located so that when joined, they form a single tooth 38 intermediate the teeth 34, 36 on the leaves. The knuckles are joined by the pin 32 that extends through a hole 42 in each knuckle. Preferably, the pin 32 is mounted so that it can be removed at will. Thus, the belt connector 10 can be separated into separate leaves, thereby separating the belt 12 so that it can be removed from its installation with ease. Conversely, the belt 12 can be rejoined by interlacing the knuckles 28, 30 so that the holes 42 are in registry, and then inserting the pin 32 through the holes.

Figure 3:
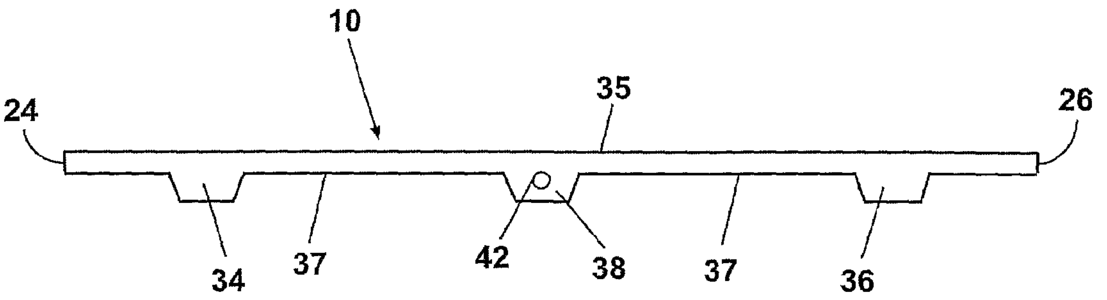
FIG. 3 is a side view of the belt connector of FIG. 2 during manufacture after the molding step.

Preferably, the belt connector 10 is formed of thermoplastic of substantially the same composition as the belt 12 to which it is to be attached. Looking at FIG. 3, it can be seen that the belt connector 10 is preferably injection molded in one piece, with the three teeth 34, 36, 38 disposed on the same pitch as the belt to which the belt connector is to be attached. As with the belt 12, the belt connector 14 has a flat side 35 substantially free of discontinuities, and recesses 37 between the teeth 34, 36, 38 opposite the flat side. Preferably, the center tooth 38 is nominally narrower than the other two teeth 34, 36, which are preferably the same in size as the teeth 18 on the belt 12. The difference is preferably on the order of 0.0001 inches, or enough to account for tolerances between the pin 32 and the holes 42 so that the width of the tooth 38 when the hinge is joined will be about the same as the width of the other teeth 34, 36. The belt connector 10 is also molded with the hole 42 extending through the center tooth 38. It will be understood that the belt connector 10 can be molded at a standard width so that if it were to be used with a narrower belt, it can simply be cut to the appropriate width.

Figure 4:
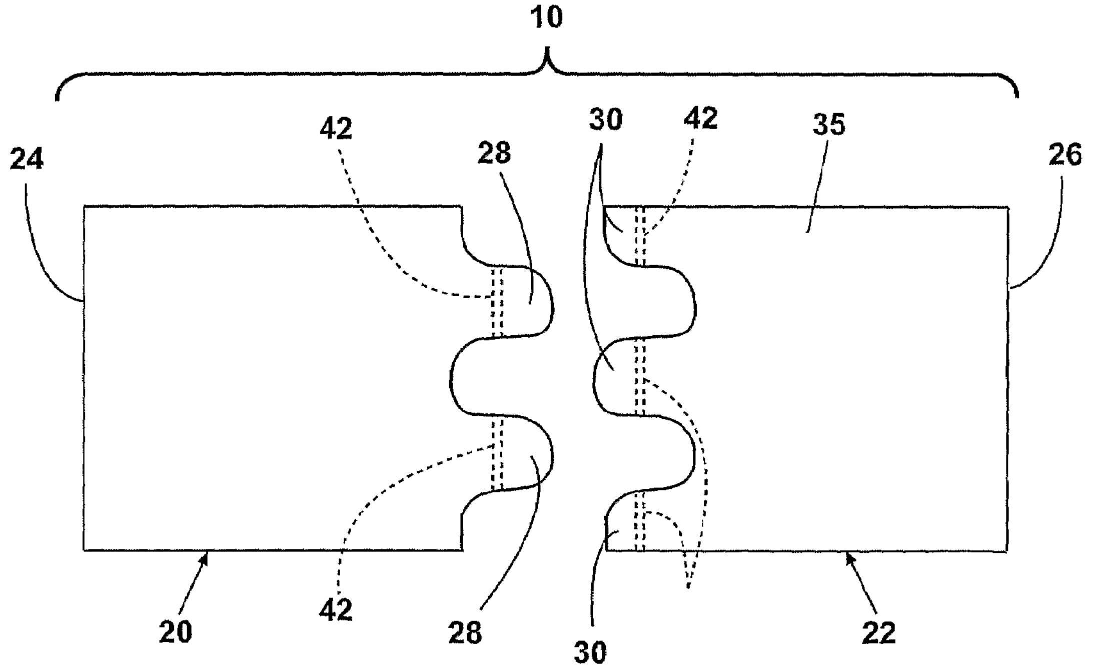
FIG. 4 is a plan view of the belt connector of FIG. 3 during manufacture after the cutting step.

Looking now at FIG. 4, it can be seen that the belt connector 10, after molding, is cut into the two leaves 20, 22. Cutting can be done by stamping, milling or any other known method of making a clean cut in thermoplastic. Preferably, the cut is a sinusoidal cut along the center tooth 38, thereby forming the individual knuckles 28, 30. The cut can take any form, such as square, saw tooth, etc. so long as there are at least two of the knuckles 34 and one of the knuckle 36 formed. Preferably there will be a plurality of knuckles 28, 30 so that a continuous hinge is formed along the tooth 38. The cut can extend into the recess 37 between the center tooth 38 and the adjacent teeth 34, 36, but preferably not too much, so that the knuckles comprise primarily the tooth 38.

Figure 5:
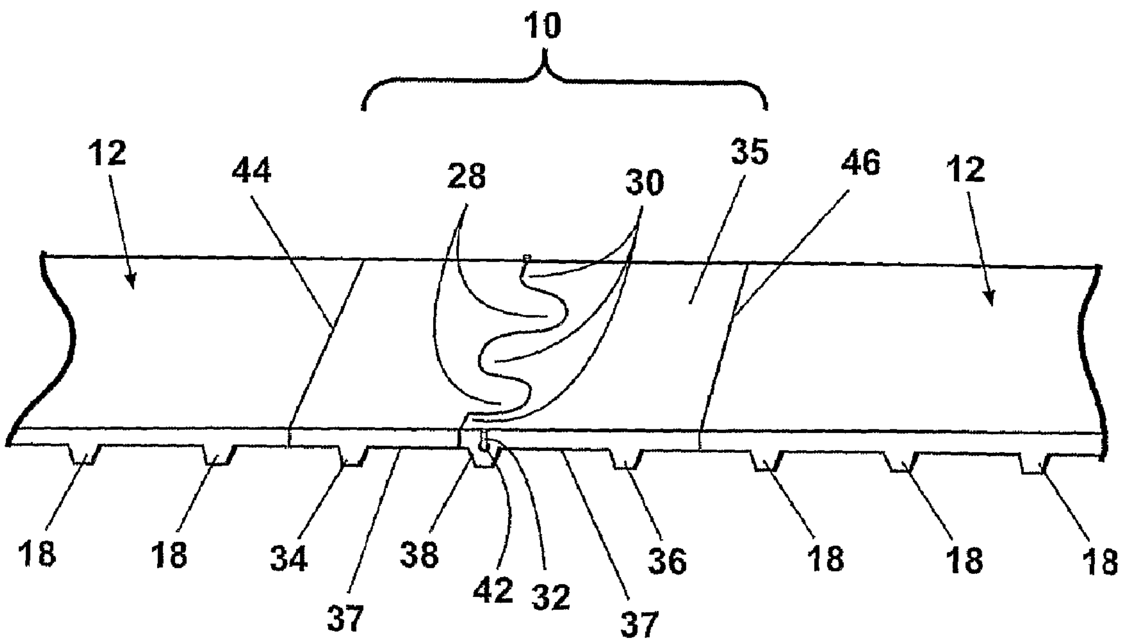
FIG. 5 is a perspective view of the belt connector and belt of FIG. 2 assembled.

To attach the belt connector to a belt as shown in FIG. 5, each leaf 20, 22 will be butt welded or otherwise secured by conventional means to the respective end 14, 16 to form respective seams 44, 46. The pin 32 is then inserted through the hole 42 to hingedly secure the respective knuckles 28, 30 to each other. Preferably, the pin 32 is a wire, coated or covered with a friction enhancing coating to retain the pin within the holes. Alternatively, the pin 32 can be fixed by other means such as simply bending the ends at an angle, or securing removable fasteners to the ends. To remove the belt 12 from its apparatus, one has only to remove the pin 32 from the holes 42 and separate the leaves 20, 22. The belt 12 is no longer endless and can be easily removed from its apparatus.

Figure 1:
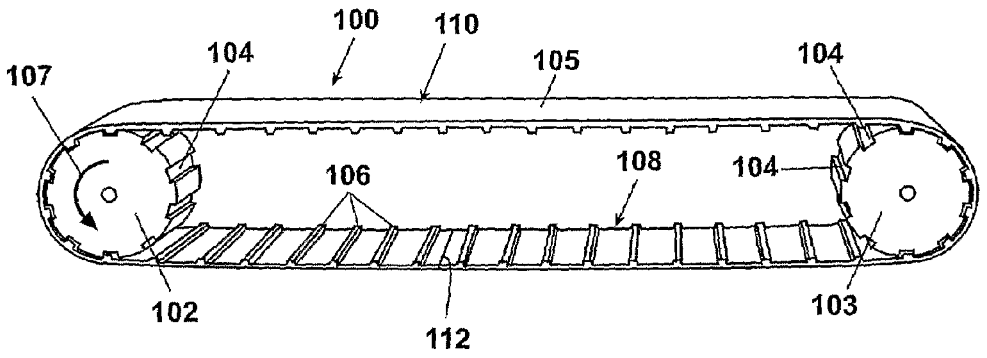
FIG. 1 is a perspective side view of a belt of the prior art installed between two sprockets.

It will be apparent that as the belt 12 moves around a sprocket 102 or 103 as in FIG. 1, the leaves 20, 22 will tend to pivot about the pin 32. As they pivot, the knuckles 28, 30 will tend to protrude from what otherwise would be a surface 35 substantially free of discontinuities. This may create a problem if a scraper were to be used at the sprocket to scrape material off the outside surface 35 as the belt 12 moves around the sprocket. The scraper may urge waste material into the voids between the knuckles.

Figure 6:
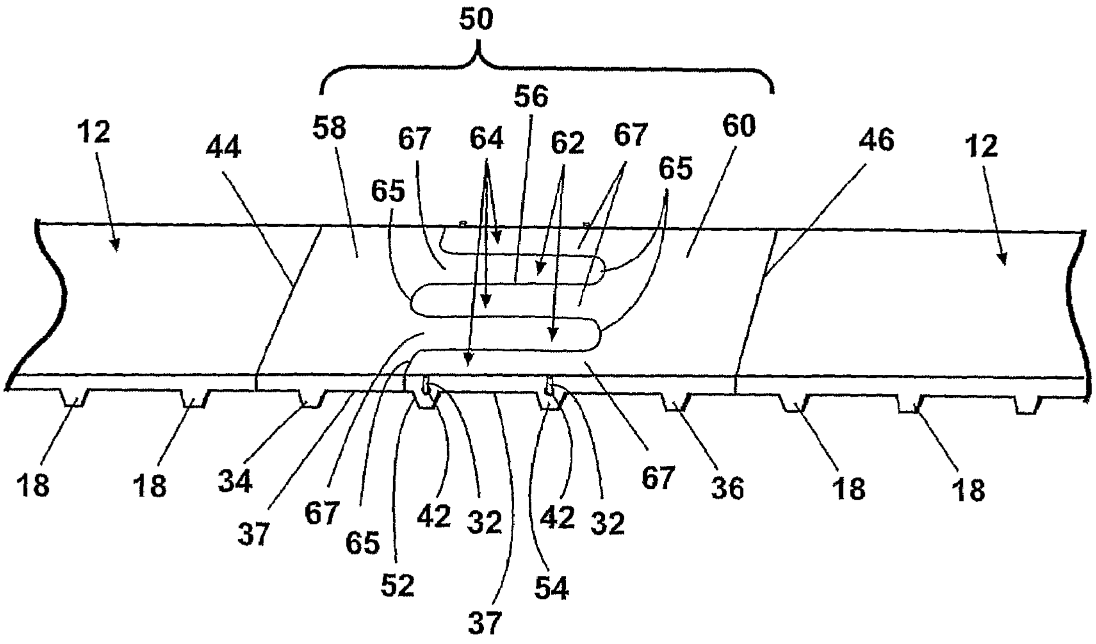
FIG. 6 is a perspective view of a second embodiment of a belt connector and belt assembled according to the invention.

Turning now to FIG. 6, a second embodiment of a belt connector 50 according to the invention provides a solution to minimize the effect of the discontinuity between the knuckles. This embodiment is in most salient respects identical to the previous embodiment, except for the addition of a tooth, a second pin, and the size of the knuckles. Consequently, like complements will bear like numerals with respect to the earlier embodiment.

The belt connector 50 is injection molded with four teeth, the two outside teeth 34, 36, and two inside teeth 52, 54, all spaced from each other the same pitch as the teeth 18 on the belt 12 to which the belt connector is attached. Each inside tooth 52, 54 is molded with the hole 42 through it, sized to receive the pin 32. A sinusoidal cut 56 extends from one side of the tooth 52 to the other side of the tooth 54 across the recess 37 between them, forming two leaves 58, 60. Each leaf 58, 60 has respective knuckles 62, 64, and each knuckle will have a portion of two of the inner teeth 52, 54 on it. One tooth portion will be o a tip 65 of each knuckle and another tooth portion will be on a base 67 of each knuckle.

Each leaf 58, 60 is butt welded or otherwise secured by conventional means to the respective end 14, 16 to form respective seams 44, 46. A pin 32 is then inserted through the holes 42 in the respective portions of the inner teeth 52, 54 to secure the respective knuckles 62, 64 to each other. As before, each pin 32 is a wire, coated or covered with a friction enhancing coating to retain the pin within the holes. Alternatively, the pin 32 can be fixed by other means such as simply bending the ends at an angle, or securing removable fasteners to the ends. It will be apparent that with two connection points for each knuckle 62, 64, the knuckles will not rotate about either pin so as to form the kind of discontinuity that appears in the first embodiment. Rather, each knuckle 62, 64 will be urged by the tension of the belt 12 and the engagement of the teeth 52, 54 with the sprocket to bend around the sprocket, thereby minimizing the discontinuity otherwise caused by the sinusoidal cut 56. As with the earlier embodiment, the cut 56 need not be limited to a sinusoidal shape, but can take any shape so long as there are at least two knuckles on one leaf and one knuckle and the other.

Figure 7:
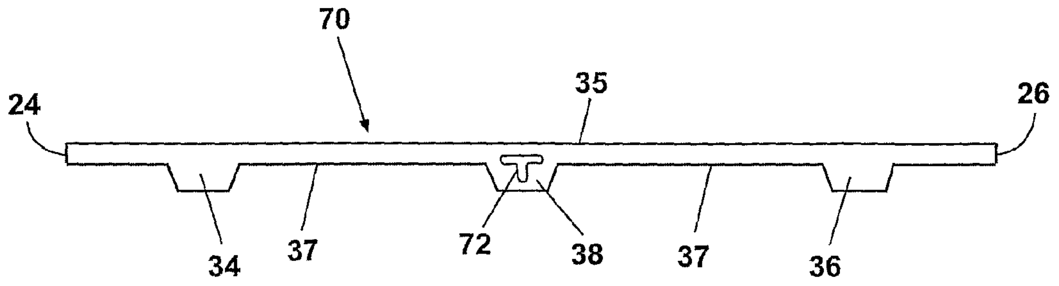
FIG. 7 is a side view of a third embodiment of belt connector during manufacture after the molding step.
Figure 8:
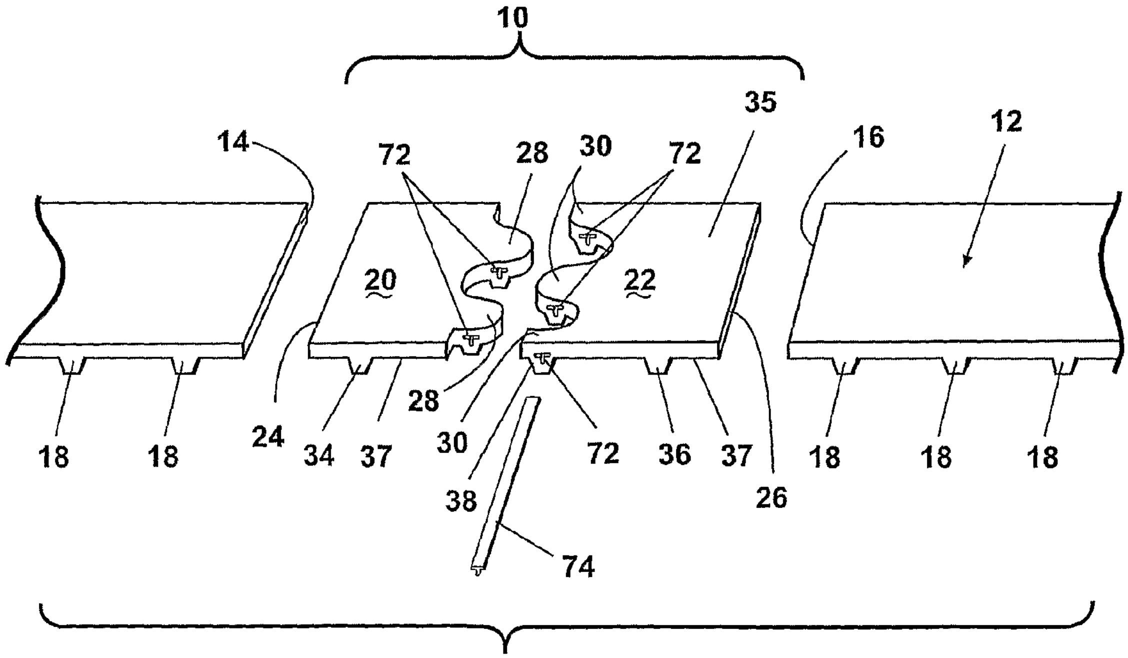
FIG. 8 is an exploded perspective view of the belt connector of FIG. 7 and a belt according to the invention.

FIGS. 7 and 8 disclose another solution to minimize the effect of the discontinuity between adjacent leaves. This embodiment of a belt connector 70 is in all salient respects identical to the first embodiment, except for the shape of the hole in the center to 38 and the shape of the pin. Here, the belt connector 70 is injection molded as before, with three teeth 34, 36, and the center tooth 38. However, the center tooth 38 is molded with a shaped opening 72, shown here with a T-shaped opening. It will be understood that any shape can be used so long as the shape is noncircular or round in cross-section. A pin 74 has a cross-sectional shape identical to the shaped opening 72, and is sized to be received fairly snugly within the shaped opening. When the two leaves 20, 22 are interlaced with the shaped openings 72 in registry, the pin 74 can be received in the opening to hold the interlaced knuckles 20, 30 together. It will be apparent that the noncircular pin 74 in the noncircular opening 72 will effectively prevent the two leaves 20, 22 from rotating about the pin. Rather, they will be held to each other by the pin 74, and as they go around the sprocket they will be forced to bend around the sprocket the same way the rest of the belt 12 does. Meanwhile, the keyed pin 72 effectively minimizes the discontinuity otherwise caused by rotation of the knuckles 28, 30.

While the invention has been specifically described in connection with certain specific embodiments thereof, it is to be understood that this is by way of illustration and not of limitation, and the scope of the appended claims should be construed as broadly as the prior art will permit. For example, in all embodiments, it is within the scope of the invention to mold individual leaves with teeth on the knuckles, as opposed to molding a single piece and then cutting individual leaves from the single piece.

We claim:

1. A thermoplastic belt without interlocking links comprising a belt connector to make the belt endless, wherein the belt connector comprises two leaves, one of the leaves having at least two knuckles and the other leaf having at least one knuckle, all knuckles having a hole therethrough, each leaf having a flat side substantially free of discontinuities wherein the knuckles are coplanar with the flat side, and further having an opposed butt end secured to the belt, and a pin adapted to extend through the holes of the knuckles when the holes are in registry to hingedly secure the leaves to each other.

2. A thermoplastic belt according to claim 1 wherein the belt has teeth on one side thereof and at least one leaf has a tooth or a tooth portion on one side thereof.

3. A thermoplastic belt according to claim 2 wherein a tooth is formed of tooth portions on the knuckles of the leaves.

4. A thermoplastic belt according to claim 3 wherein the hole in each knuckle extends through the tooth portion so that when the pin extends through the holes, it will extend through the tooth.

5. A thermoplastic belt according to claim 2 wherein each leaf has a tooth or a tooth portion on one side thereof.

6. A thermoplastic belt according to claim 5 wherein the tooth is formed of tooth portions on the knuckles of the leaves.

7. A thermoplastic belt according to claim 6 wherein the hole in each knuckle extends through the tooth portion so that when the pin extends through the holes, it will extend through the tooth portion, said tooth portions on the knuckles being aligned to form a single tooth on the belt.

8. A thermoplastic belt according to claim 1 wherein the holes and the pin are keyed so that the pin cannot rotate relative to the holes.

9. A thermoplastic belt according to claim 1 wherein the knuckles are elongated and all knuckles have two holes therethrough, spaced from each other, one toward a tip of the knuckle and the other toward a base of the knuckle and disposed so as to align in registry when the knuckles are interpositioned with each other.

10. A thermoplastic belt according to claim 9 wherein the belt has teeth on one side thereof and at least one leaf has teeth or tooth portions on one side thereof.

11. A thermoplastic belt according to claim 10 wherein two teeth are formed of tooth portions on the knuckles of the leaves.

12. A thermoplastic belt according to claim 11 wherein the holes in each knuckle extend through the tooth portions so that when the pin extends through the holes, it will extend through the teeth.

13. A thermoplastic belt according to claim 9 wherein the holes and the pin are keyed so that the pin cannot rotate relative to the holes.

14. A method of making a belt connector comprising the steps of:

molding a piece of thermoplastic material with a flat on one side and three teeth on the other side, a center tooth having a hole extending therethrough; and cutting the piece into two leaves along the center tooth wherein at least two knuckles are formed in one leaf and one knuckle is formed in the other leaf, each knuckle having a tooth portion with a hole through it.

15. A thermoplastic belt connector for connecting the ends of a thermoplastic belt to make an endless belt, the belt connector comprising two leaves, one of the leaves having at least two knuckles and the other leaf having at least one knuckle, all knuckles having a hole therethrough, each leaf having a flat side substantially free of discontinuities wherein the knuckles are coplanar with the flat side, and further having an opposed butt end adapted to be secured to a belt, and a pin adapted to extend through the holes of the knuckles when the holes are in registry to hingedly secure the leaves to each other.

16. A thermoplastic belt connector according to claim 15 wherein at least one leaf has a tooth or a tooth portion on one side thereof.

17. A thermoplastic belt connector according to claim 16 wherein at least one tooth is formed of tooth portions on the knuckles of the leaves.

18. A thermoplastic belt connector according to claim 17 wherein the hole in each knuckle extends through the tooth portion so that when the pin extends through the holes, it will extend through the tooth portions.

19. A thermoplastic belt connector according to claim 18 wherein the holes and the pin are keyed so that the pin cannot rotate relative to the holes.

20. A thermoplastic belt connector according to claim 15 wherein the knuckles are elongated and all knuckles have two holes therethrough, spaced from each other, one toward a tip of the knuckle and the other toward a base of the knuckle and disposed so as to align in registry when the knuckles are interpositioned with each other.

21. A thermoplastic belt according to claim 20 wherein the belt has teeth on one side thereof and at least one leaf has teeth or tooth portions on one side thereof.

22. A thermoplastic belt according to claim 21 wherein two teeth are formed of tooth portions on the knuckles of the leaves.

23. A thermoplastic belt according to claim 22 wherein the holes in each knuckle extend through the tooth portions so that when the pin extends through the holes, it will extend through the teeth.

* * * * *

UNITED STATES PATENT AND TRADEMARK OFFICE

CERTIFICATE OF CORRECTION

PATENT NO. : 7,594,574 B2 
APPLICATION NO. : 11/718274
DATED : September 29, 2009
INVENTOR(S) : Edward T. Mol and James Honeycutt It is certified that error appears in the above-identified patent and that said Letters Patent is hereby corrected as shown below:

On the front page of the patent in the (*) Notice:

The Notice reads: "Subject to any disclaimer, the term of this patent is extended or adjusted under 35 U.S.C. 154(b) by 0 days."

It should read: "Subject to any disclaimer, the term of this patent is extended or adjusted under 35 U.S.C. 154(b) by 81 days."

Signed and Sealed this

Twenty-fourth Day of November, 2009

David J. Kappos
*Director of the United States Patent and Trademark Office*